United States Patent [19]
Philippe et al.

[11] Patent Number: 6,071,116
[45] Date of Patent: Jun. 6, 2000

[54] HEAT RECOVERY APPARATUS AND METHODS OF USE

[75] Inventors: Louis C. Philippe, Oakbrook Terrace; Fabien S. Illy, Justice; Eric L. Duchateau, Clarendon Hills, all of Ill.

[73] Assignees: American Air Liquide, Inc., Walnut Creek, Calif.; L'Air Liquide, Societe Anonyme pour l'Etude et, l'Exploitation des Procedes Georges Claude, Paris, France

[21] Appl. No.: 08/834,454

[22] Filed: Apr. 15, 1997

[51] Int. Cl.[7] .......................................... F24H 6/00

[52] U.S. Cl. ................. 432/29; 432/72; 431/11; 431/215

[58] Field of Search .................. 432/72, 29; 110/254; 431/11, 215, 207

[56] References Cited

U.S. PATENT DOCUMENTS

| | | | |
|---|---|---|---|
| 4,060,380 | 11/1977 | Bolt | 432/179 |
| 4,101,265 | 7/1978 | Broach et al. | 432/29 |
| 5,129,335 | 7/1992 | Lauwers | 110/346 |
| 5,154,599 | 10/1992 | Wunning | 431/215 |
| 5,425,317 | 6/1995 | Schaub et al. | 110/346 |

Primary Examiner—Denise L. Ferensic
Assistant Examiner—Jiping Lu
Attorney, Agent, or Firm—Jeffrey L. Wendt

[57] ABSTRACT

Apparatus and methods suitable for recovery of heat from hot flue gases are presented comprising primary heat transfer means for exchanging heat between a hot flue gas and an intermediate fluid to create a hot intermediate fluid from an originally cold intermediate fluid; one or more oxidant-fuel burners which create the main flow of hot flue gas, and transport means for transporting the hot intermediate fluid to the heat exchanger means. The apparatus and method of the invention solve the problem of recovery of heat from dirty, toxic, or erosive flue gases.

21 Claims, 4 Drawing Sheets

HEAT RECOVERY APPARATUS AND METHODS OF USE

BACKGROUND OF THE INVENTION

1. Field of the Invention

The present invention relates in general to gaseous fuel burners. More specifically the invention relates to energy efficient burning of fuel using such burners.

2. Related Art

Oxy-fuel burners and technologies are being used more and more in high temperature processes such as, glass manufacturing, incineration of wastes, steel reheating, aluminum smelting, and iron smelting, for the benefits they provide:

high heat transfer rates;

fuel consumption reductions (energy savings);

reduced volume of flue gas;

reduction of pollutants emission, such as oxides of nitrogen (NOx), carbon monoxide (CO), and particulates.

Oxygen used in these high temperature processes can be technically pure oxygen (99.99%) or various grades of industrial oxygen, with purities down to 80%.

Despite the reduction of the flue gas volume that the substitution of combustion with air by combustion with pure oxygen yields, a significant amount of energy is lost in the flue gas, especially for high temperature processes. For example, in an oxy-fuel fired glass furnace where all the fuel is combusted with pure oxygen, and for which the temperature of the flue gas at the furnace exhaust is of the order of 1350° C., typically 30% to 40% of the energy released by the combustion of the fuel is lost in the flue gas. It would be advantageous to recover some of the energy available from the flue gas in order to improve the economics of operating an oxy-fuel fired furnace.

A number of techniques to recover energy from flue gases are available. Those techniques have been proven or described for air-fuel fired furnaces. Similar techniques have yet to be demonstrated for oxy-fuel furnaces, because of difficulties that will become apparent from the following discussion.

One technique consists in using the energy available in the flue gas to preheat and dry out the raw materials before loading them into the furnace. In the case of glass melting, the raw materials consist of recycled glass, commonly referred to as cullet, and other minerals and chemicals in a pulverized form referred to as batch materials that have a relatively high water content. The energy exchange between the flue gas and the raw materials is carried out in a batch/cullet preheater. Such devices are commonly available, for example from Zippe Inc. of Wertheim, Germany. Experience shows that this technology is difficult to operate when the batch represents more than 50% of the raw materials because of a tendency to plug. This limits the applicability of the technique to a limited number of glass melting operations that use a large fraction of cullet. Another drawback of this technique is that the inlet temperature of the flue gas in the materials preheater must be generally kept lower than 600° C. In the case of an oxy-fuel fired furnace where the flue gas is produced at a temperature higher than 1000° C., cooling of the flue gas prior to the materials preheater would be required.

Energy efficiency of air-fuel furnaces is greatly improved if the energy available from the flue gas is used to preheat the combustion air. Recuperators, where some of the heat from the flue gas is transferred to the combustion air in a heat exchanger, and regenerators, where some of the heat from the flue gas is accumulated in a ceramic or refractory material for later preheating of the combustion air, are the most common techniques encountered in the industry for this purpose. Such techniques are difficult to apply in the case of oxy-fuel fired furnaces because of the hazards of handling the extremely reactive hot oxygen.

Thermochemical energy recovery (also known as fuel reforming) is another technique that consists in increasing the heat content of a fuel by reacting it with steam or carbon dioxide or a mixture of the two in a reactor (reformer), and generating a combustible mixture that contains hydrogen ($H_2$) and carbon monoxide (CO) and has a higher heat content than the initial fuel. The reforming reaction occurs at high temperature (typically 900° C.), is endothermic, and takes advantage of the high temperature of the flue gases to generate the high temperature gases required by the process, and to provide the energy for the reforming reaction. Practically, the fuel consumption in a glass plant is not high enough to provide an economical justification to the high capital cost of installing a fuel reforming system. The complexity of the reformer, and safety constraints linked to handling hot $H_2$ and CO, are additional drawbacks of this technology. In the case of oxy-fuel furnaces, the energy available from the flue gas is typically not sufficient for reforming all the fuel, and an additional energy source is generally required in addition to the flue as, which adds to the complexity of the apparatus.

Co-generation of power and heat (i.e. the simultaneous generation of electricity and steam using the hot flue gases) is another technique that is available to recover the energy from flue gas, and use it for other purposes than recycling into the furnace. The disadvantage of this approach is that the capital costs tend to be very high. This option is, however, viable for very high heat output furnaces (those which produce greater than 30 megawatts of power).

With stricter environmental regulations, a number of industries are required to install pollution abatement systems. Those devices typically cannot handle the very high temperatures found at the exhaust of an oxy-fuel furnace used for a high temperature process. For instance, at the outlet of an oxy-fuel fired glass tank furnace, the temperature typically ranges from about 1300° C. to about 1450° C. Before the flue gases can be treated by the pollution abatement system (which can be an electrostatic precipitator or a baghouse in the case of cleaning the flue gas from particulate matter) it is highly preferable to cool down the gases. This is generally performed by diluting the gases with ambient air, or spraying of water that vaporizes upon contact with the hot gases, to yield a cooling of the gases, or by a combination of these techniques. Dilution with air increases the amount of gas to be treated by the pollution abatement system, which increases its cost. Water injection elevates the dew point of the gases and forces the pollution abatement device to operate at high temperature. This is especially true for oxy-fuel fired furnaces where the water content of the flue gases can be as high as 60% by volume.

What is needed then is a method and apparatus (or system) which efficiently and at relatively low capital cost recovers at least a portion of the available heat which otherwise is wasted to the atmosphere, particularly in high temperature processes where oxy-fuel burners are employed, and simultaneously cools down the flue gases.

SUMMARY OF THE INVENTION

In accordance with the invention, methods and apparatus are presented which combine one or more oxy-fuel burners operating with either hot oxidant, hot fuel, or both, with use of a primary heat exchanger disposed in a flue gas channel. As used herein the term "oxidant" is used to mean either pure oxygen (as defined in the industry) or oxygen enriched air. "Process gas" as used herein refers to gases and particles including all gases which are not combustion products. The primary heat exchanger employs an intermediate safe fluid (air or nitrogen for example) to transfer at least a portion of the heat from the hot flue gases to either the oxidant, the fuel, or both, used in the burners. The function of the primary heat exchanger is to transfer at least a portion of the heat from the hot flue gases to the intermediate safe fluid (hereinafter referred to simply as the intermediate fluid). Removing the energy of the flue gases in a heat exchanger is a convenient means of cooling of the flue gases without increasing the quantity of flue gases or increasing the water content of these gases. The dimension of pollution abatement device that may be installed before the gases are exhausted to the atmosphere can be smaller, and the cost of the equipment can be lower. Some of the heat content of the intermediate fluid is then transferred to the oxidant, fuel, or both as explained herein. The hot oxidant and the hot fuel are combusted in the furnace using the oxy-fuel burners.

A first aspect of the invention is an apparatus suitable for recovery of heat from hot flue gases, the apparatus comprising:

(a) at least one primary means for transferring heat between a hot flue gas having a hot flue gas temperature, and an initially cold intermediate fluid, the initially cold intermediate fluid having a cold intermediate fluid temperature which is less than the hot flue gas temperature, to create a hot intermediate fluid and to cool the hot flue gas;

(b) one or more oxidant-fuel burners which create the main flow of the hot flue gas, the oxidant-fuel burners being associated with preheater means in which either a fuel or an oxidant is preheated by the hot intermediate fluid, and thus creating a cooled intermediate fluid, and;

(c) transport means for transporting the hot intermediate fluid to at least one of the preheater means.

Preferred apparatus of the invention are those wherein the intermediate fluid is a gas, more preferably air. Other possible fluids include steam, carbon dioxide, nitrogen, or mixtures thereof, or even liquids.

In this and other aspects of the invention it is possible for the hot intermediate fluid to transfer heat to the oxidant or the fuel either indirectly by transferring heat through the walls of a heat exchanger, or a portion of the hot intermediate fluid could exchange heat directly by mixing with the oxidant or the fuel. In most cases, the heat transfer will be more economical and safer if the heat transfer is indirect, in other words by use of a heat exchanger where the intermediate fluid does not mix with the oxidant or the fuel, but it is important to note that both means of exchanging heat are contemplated by the present invention. Further, the intermediate fluid could be heated by the hot flue gases by either of the two mechanisms just mentioned.

In one preferred apparatus of the invention, the cooled intermediate fluid is transported back to the primary means for transferring heat.

Preferably, the primary means for transferring heat comprises one or more heat exchangers selected from the group consisting of ceramic heat exchangers, known in the industry as ceramic recuperators, and metallic heat exchangers further referred to as metallic recuperators.

Preferred apparatus in accordance with the invention are those wherein the primary means for transferring heat are double shell radiation recuperators.

Preheater means useful in the invention comprise heat exchangers selected from the group consisting of ceramic heat exchangers, metallic heat exchangers, regenerative means alternatively heated by the flow of hot intermediate fluid and cooled by the flow of oxidant or fuel that is heated thereby, and combinations thereof. In the case of regenerative means alternately heated by the flow of hot intermediate fluid and cooled by the flow of oxidant or fuel, typically and preferably there is present two vessels containing an inert media, such as ceramic balls or pebbles. One vessel is used in a regeneration mode, wherein the ceramic balls, pebbles or other inert media are heated by hot intermediate fluid, while the other is used during an operational mode to contact the fuel or oxidant in order to transfer heat from the hot media to the fuel or oxidant, as the case might be. The flow to the vessels is then switched at an appropriate time.

One preferred apparatus in accordance with this aspect of the invention is that wherein the hot intermediate fluid exchanges heat with the fuel and oxidant in parallel preheater means, in other words, hot intermediate fluid is split into two streams, one stream exchanging heat with the fuel in a first burner preheater means, the second stream exchanging heat with the oxidant in a second burner preheater means. Alternatively, and perhaps more preferred for safety reasons, the intermediate fluid exchanges heat first with the oxidant in one or more oxidant preheaters, and then with the fuel in one or more fuel preheaters in series exchangers.

Preferably, the apparatus of the invention comprises burners where oxidant and fuel are injected separately in the furnace where they mix in such fashion to form a flame. Yet another preferred apparatus of the invention comprises burners wherein oxidant and fuel are injected in the furnace through a burner block.

Another aspect of the invention is an apparatus suitable for recovery of heat from hot flue gases, the apparatus comprising:

(a) at least one primary means for transferring heat between a hot flue gas having a hot flue gas temperature, and an initially cold intermediate fluid, the initially cold intermediate fluid having a cold intermediate fluid temperature which is less than the hot flue gas temperature, to create a hot intermediate fluid and to cool the hot flue gas;

(b) one or more oxidant-fuel burners which create the main flow of hot flue gas, the oxidant-fuel burners having a fuel path for a fuel, an oxidant path for an oxidant, and a hot intermediate fluid path, wherein the hot intermediate fluid exchanges heat with either the oxidant, the fuel, or both the oxidant and the fuel, to create a cooled intermediate fluid; and (c) transport means for transporting the hot intermediate fluid to the oxidant-fuel burners.

As with the first aspect of the invention, preferably the intermediate fluid is air although other gases such as steam, carbon dioxide, nitrogen, or mixtures thereof, and liquids may be used.

In one preferred apparatus of the invention, the cooled intermediate fluid is transported back to the primary means for transferring heat from the hot flue gas to the initially cold intermediate fluid.

In this aspect of the invention, the fuel path, oxidant path, and the hot intermediate fluid path are preferably defined by bores through a furnace refractory wall, that is, the burner is preferably integral with the furnace wall in that it is comprised of the same material (refractory or ceramic). Alternatively, the fuel path, oxidant path, and the hot intermediate fluid path are preferably defined by bores through a burner block as is known in the burner art, the burner block being positioned in a furnace wall. Such a burner block is described, for example, in U.S. patent application Ser. No. 08/668,758, filed Jun. 24, 1996, allowed on Sep. 30, 1998, and its co-pending continuation application, U.S. Ser. No. 09/093,495, filed Jun. 8, 1998; and U.S. co-pending patent application Ser. No. 08/756,126, filed Nov. 26, 1996, allowed on Sep. 22, 1998, and its co-pending continuation application U.S. Ser. No. 09/211,603, filed Dec. 14, 1998, each of which is incorporated herein by reference.

A preferred apparatus in accordance with this aspect of the invention is that wherein the hot intermediate fluid exchanges heat with the fuel and oxidant in parallel preheaters, in other words, hot intermediate fluid is split into two streams, one stream exchanging heat with the fuel in a first burner heat exchanger, the second stream exchanging heat with the oxidant in a second burner heat exchanger.

Alternatively, and perhaps more preferred, the intermediate fluid exchanges heat with the fuel and oxidant in series exchangers, with the hot intermediate fluid first exchanging heat with the oxidant, and then the fuel, this being deemed safer.

When the intermediate fluid is air, and the oxidant for combustion is oxygen, the hot air can be advantageously used as the combustion oxidant by directing the hot air flow to the burners, when the oxygen supply is interrupted.

The third embodiment of the invention is a method of recovering heat from hot flue gases created from combustion of a fuel with an oxidant, the method comprising the steps of:

a) combusting the fuel with the oxidant in one or more oxidant-fuel burners to create the main flow of hot flue gas;

b) flowing a hot flue gas and an initial intermediate fluid having an initial intermediate fluid temperature through primary means for transferring heat between the hot flue gas and the initial intermediate fluid to create a hot intermediate fluid;

c) transferring heat from the hot intermediate fluid to either the fuel, the oxidant, or both, by flowing the hot intermediate fluid through one or more preheater means in which either the fuel, the oxidant, or both are preheated with the hot intermediate fluid prior to the fuel and the oxidant entering one or more oxidant-fuel burners which create said main flow of hot flue gas.

The fourth embodiment of the invention is a method of recovering heat from hot flue gases created from combustion of a fuel with an oxidant, the method comprising the steps of:

a) combusting the fuel with the oxidant in one or more oxidant-fuel burners to create the main flow of hot flue gas;

b) flowing a hot flue gas and an initial intermediate fluid, having an initial intermediate fluid temperature, through primary means for transferring heat between the hot flue gas and the initial intermediate fluid to create a hot intermediate fluid;

c) transferring heat from the hot intermediate fluid to either the fuel, the oxidant, or both, by flowing the hot intermediate fluid through one or more oxidant-fuel burners which create the main flow of hot flue gas, the oxidant-fuel burners having a fuel path for a fuel, an oxidant path for an oxidant, and a hot intermediate fluid path, wherein the hot intermediate fluid exchanges heat with either the oxidant, the fuel, or both the oxidant and the fuel, to create a cooled intermediate fluid.

It must be understood from the description herein that these methods are not strictly limited to embodiments wherein the fuel and oxidant are heat exchanged with the intermediate fluid at the same temperature of the intermediate fluid. In some embodiments, it is preferred to contact the hot intermediate fluid first with the oxidant, creating an intermediate fluid having a lower temperature, and subsequently exchanging heat of this lower temperature intermediate fluid with the fuel. Also, as stated previously, in certain embodiments, it is contemplated that the hot intermediate fluid could be mixed with the oxidant, the fuel or both.

Another aspect of the invention pertains to furnaces fired form the side. This aspect of the invention is a method of recovering heat in such a furnace that uses multiple oxidant-fuel burners, the method comprising:

a) creating the main flow of hot flue gas by burning a fuel with an oxidant in a plurality of side-mounted burners, a first portion of the burners mounted on a first side of a furnace, and a second portion of the burners mounted on an opposite side of the furnace;

b) flowing the hot flue gas through a stack at a first temperature (preferably at a temperature ranging from about 1000° C. to about 1700° C.);

c) flowing an initial intermediate fluid having an initial intermediate fluid temperature (preferably air at ambient temperature, about 25° C.), through a primary means for transferring heat (preferably a radiative metallic recuperator) to preheat the initial intermediate fluid (preferably to a temperature ranging from about 500 to about 900° C.) thus creating a hot intermediate fluid;

d) splitting the hot intermediate fluid flow into two streams, a first stream flowing to the first side of the furnace and a second stream flowing to the opposite side of the furnace, wherein on each of said first and opposite sides of the furnace are positions a plurality of oxidant preheaters and a plurality of fuel preheaters, and a plurality of burners, (preferably the number of oxidant preheaters is less than the number of burners and the number of fuel preheaters is less than the number of burners, (preferably the burners are grouped in pairs in order to reduce the number of oxidant and fuel preheaters);

e) flowing each of the first and second flows of hot intermediate fluid through one or more oxidant preheaters (preferably metallic or ceramic) in series, thus creating first and second flows of cooled intermediate fluid and a plurality of heated oxidant streams (the heated oxidant preferably having a temperature ranging from about 400 to about 800° C.);

f) flowing the cooled intermediate fluid through the fuel preheaters also installed in series, thereby creating a cold intermediate fluid and a plurality of heated fuel streams (preferably heating the fuel to a temperature ranging from about 200 to about 300° C.); and g) splitting the heated oxidant and heated fuel streams to amount of streams equal to the number of burners to combust the fuel in the furnace, thus creating the main flow of hot flue gas.

Yet another aspect of the invention pertains to furnaces fired from one end. This aspect of the invention is a method of recovering useful heat in such a furnace, the method comprising the steps of:

a) combusting a fuel in a primary oxidant-fuel burner positioned at an end of the end-fired furnace, the primary burner supplying the main part of the energy to a load and creating the main flow of hot flue gas, and one or more additional conventional oxidant-fuel burners positioned generally opposite of the primary burner, for better coverage of a firing zone in the end-fired furnace;

b) flowing the hot flue gas through a stack at a first temperature (preferably at a temperature ranging from about 1000° C. to about 1700° C.);

c) flowing an initial intermediate fluid having an initial intermediate fluid temperature (preferably air at ambient temperature, about 25° C.), through a primary means for transferring heat (preferably a radiative metallic recuperator) to preheat the initial intermediate fluid (preferably to a temperature ranging from about 500 to about 900° C.) thus creating a hot intermediate fluid;

d) flowing the hot intermediate fluid to an oxidant preheater, thus producing a first cooled intermediate fluid and preheated oxidant;

e) flowing the cooled intermediate fluid to a fuel preheater, thus producing a second cooled intermediate fluid and heated fuel, the second cooled intermediate fluid having a temperature lower than the first cooled intermediate fluid, (preferably flowing the second cooled intermediate fluid to the stack at a temperature of about 300° C.); and f) flowing the heated oxidant and heated fuel streams to the primary oxidant-fuel burner to create the main flow of the hot flue gas leaving the furnace, the conventional burners also contributing to the hot flue gas.

Yet another aspect of the invention is also related to heat recovery in furnaces fired from one end, this aspect being a method similar to the first method of recovering heat from such a furnace, but differing in that this furnace has a plurality of primary burners (typically two) and the hot intermediate fluid is split into more than one stream after leaving the primary means for transferring heat, and transported to multiple oxidant preheaters and then multiple fuel preheaters.

Further advantages and aspects of the invention will become apparent by reviewing the following description and claims.

DESCRIPTION OF PREFERRED EMBODIMENTS

The apparatus of the invention includes at least the following three components. The first component is primary heat transfer means located in the furnace flue stack or at least in contact with the flue gases. In typical commercial furnaces, the operating flue gases are typically and preferably hot, having a temperature ranging from about 1000° to about 1700° C. In some processes such as found in the glass industry, the hot flue gases frequently carry particulates, or toxic species such as $SO_2$, NOx, CO, and unburned hydrocarbons. The flue gas may also comprise corrosive components such as NaOH, sulfates, borates and the like in volatilized form.

The primary heat transfer means must be able to withstand temperatures in the above range. Preferably, refractory alloys, such as Inconel 600, Hasteloy, and the like, or ceramic materials are exemplary. Other suitable materials for the primary heat transfer means include composites of metals and ceramic materials such as ceramic coated metals.

As previously discussed, the primary heat transfer means employs an intermediate fluid to transfer some heat from the flue gases either to the oxidant, the fuel or both. The intermediate fluid is preferably clean, non-toxic, and non-combustible. Further, the intermediate fluid must be capable of being heated in the heat transfer means by the hot flue gases up to about 800°–1600° C. Preferred fluids include gases such as air, nitrogen, carbon dioxide, water vapor, and the like. Other preferred fluids include liquids, such as water, glycols, and the like, including mixtures of same. Air is the particularly preferred intermediate fluid for use in the present invention.

The second component of the apparatus of the present invention is transport means which transports the hot intermediate fluid to the vicinity of the fuel burners to exchange heat with the fuel, the oxidant, or both. Thus the hot flue gases preferably do not contact the oxidant or the fuel used to fire the furnace burners. This is particularly advantageous since particulates, corrosive gases, and volatile components commonly found in flue gases will not contaminate the oxidant, the fuel or the burners themselves and will not contaminate the transport means.

The heat transport means is typically and preferably a carbon steel pipe, possibly internally lined with refractory material. Other, more exotic metal materials may be used which may not have to be internally lined with refractory, such as Inconel 600, Hasteloy, and stainless steel 310, although their use is not preferred as much as carbon steel pipe possibly internally lined with refractory due to the expense of the exotic materials. The outer surface of the heat transport means is insulated to minimize heat losses from the transport means, and maintain the intermediate fluid at its initial high temperature, or substantially close thereto.

The third feature of the apparatus and method of the invention are the oxidant-fuel burners in combination with preheater means. The burner provides means of ejecting the fuel (preheated or not) and the oxidant (preheated or not) into the furnace, in such manner that a flame is formed in the furnace and provides heat to the furnace load. The preheaters of course function to preheat the oxidant and/or the fuel which is sent to the burner. This is accomplished either with an integrated heat exchanger in the burner, such that the hot intermediate fluid transfers heat through a partition or other means inside the burner with either the fuel or the oxidant or both. Alternatively, the burner preheaters can be of the type wherein a bed of ceramic balls or bricks is preheated with the hot intermediate fluid, and then the oxidant or fuel caused to flow therethrough to preheat the oxidant or fuel prior to its entering the burner. A second bed of ceramic balls or bricks can be provided for the oxidant or the fuel when a continuous flow of oxidant or fuel is required at the burner for a continuous operation. The burner preheaters can be either in parallel or in series. In series embodiments, it is preferred to preheat the oxygen or oxidant with the hotter part of the intermediate fluid to prevent any fuel cracking problems that may occur at high temperatures. Preferred configurations are those where both the fuel and the oxidant are preheated with heat exchangers that are integrated in the burner, and where the fuel is preheated with a preheater integrated in the burner and the oxidant is preheated with a bed of ceramic balls or bricks.

In order that the burners may use the hot oxidant with the fuel without serious safety problems, the difficulties mainly lay in handling hot oxygen. Therefore, the parts of the burners used in the apparatus and process of the invention in contact with hot oxygen are preferably made of material compatible with hot oxygen or other oxidant. These compatible materials are preferably refractory oxides such as silica, alumina, alumina-zirconia-silica, zirconia and the like. Alternatively, certain metallic alloys that do not combust in hot oxygen use may be used. Coating metallic materials with ceramic materials on the surface exposed to hot oxygen can also be employed for the construction of the oxidant-fuel burners.

In preferred embodiments of the invention the burner may form a part of the furnace wall, or the burner may be a separate burner block outside of the furnace wall.

The various burner embodiments and other aspects of the invention will be understood further with reference to the drawing figures.

Figure 1:
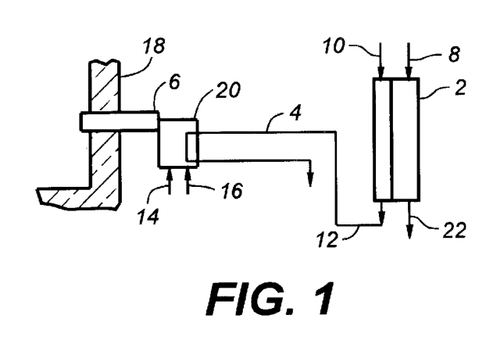
FIG. 1 is a schematic process flow diagram representing method and apparatus of the invention.

FIG. 1 is a schematic process flow diagram illustrating the three main components of the apparatus of the invention. Thus, FIG. 1 illustrates a primary heat transfer means 2, a transport means 4 which transports the intermediate fluid from primary heat transfer means 2 to a series of burners 6. At primary heat transfer means 2, which is preferably located in the flue stack of the furnace in question, hot flue gases 8 are fed through exchanger 2 preferably in a co-current fashion to a cool stream of intermediate fluid 10 having an initial temperature. Counter-current or cross-flow heat exchange modes are also possible for primary heat transfer means 2. Stream 10 of intermediate fluid exchanges heat with the flue gas in primary heat transfer means 2. Intermediate fluid exits primary heat transfer means 2 as a hot intermediate fluid 12. Hot intermediate fluid 12 is then transported by transport means 4 to burner preheater 20, wherein cool fuel 14 and cool oxidant 16 enter the preheater. Preferably there are separate preheaters 20a and 20b as further denoted herein. Also illustrated in FIG. 1 is the burner itself 6, and furnace wall 18.

Figure 2:
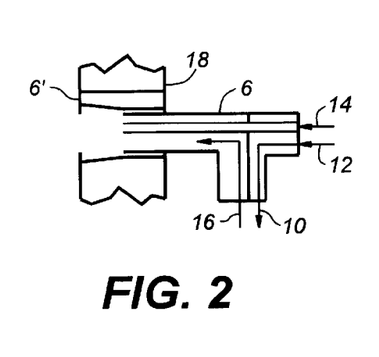
FIG. 2 illustrates one preferred burner useful in accordance with the invention.

FIG. 2 illustrates one preferred burner useful in accordance with the invention, wherein a fuel gas inlet is provided where cool fuel gas 14 enters the burner, and an oxidant inlet is provided where cool oxidant 16 enters the burner. Hot intermediate fluid 12 exchanges heat with fuel gas 14 in a preheater integral to the burner, while the hot intermediate fluid also exchanges heat with the cold oxidant stream 16 in a preheater integral to the burner. Warm fuel and oxidant are separately transported to the burner outlet, and ejected in the furnace through a burner block 6', the burner block 6' being positioned in a furnace wall 18.

Figure 3A:
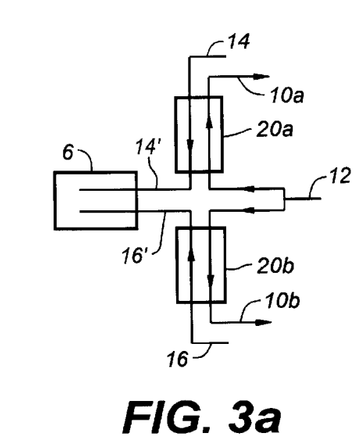
FIGS. 3a and 3b, respectively are schematic process flow diagrams of parallel and series heat exchange between a hot intermediate fluid and an oxidant and a fuel.

FIG. 3a illustrates an embodiment wherein the burner preheaters 20a and 20b are arranged in parallel fashion with respect to the flow of hot intermediate fluid 12, cool fuel 14 and cool oxidant 16. Preheater 20a creates a warm fuel stream 14' and a warm intermediate stream 10a. Similarly, burner preheater 20b creates a warm oxidant stream 16' and a cool intermediate stream 10b.

Figure 3B:
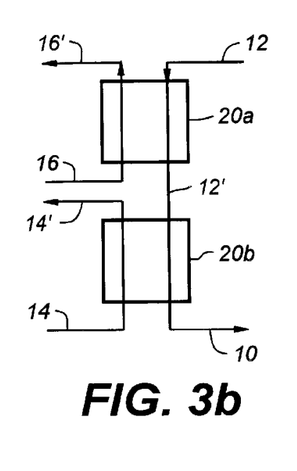

FIG. 3b represents a schematic process flow diagram of two burner preheaters 20a and 20b arranged in serial flow with respect to the flow of hot intermediate fluid 12. Thus hot intermediate fluid 12 enters burner preheater 20a and exchanges heat first with a cold oxidant stream 16 and produces a warm oxidant stream 16'. After exchanging heat with the oxidant, a cooler intermediate fluid stream 12' flows through transport means 4 into second burner preheater 20b so that the hot intermediate fluid exchanges heat with a cool fuel stream 14 to create a warm fuel stream 14'. Warm intermediate fluid 10 is then returned to the flue gas exchanger previously described.

Figures 4, 5:
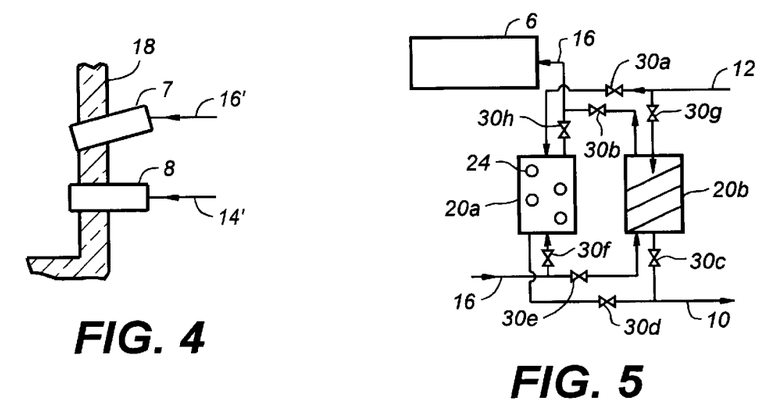
FIG. 4 illustrates one preferred burner useful in accordance with the invention.
FIG. 5 is a schematic process flow diagram of method and apparatus of the invention wherein two regenerative heat exchangers are employed.

FIG. 4 represents a burner useful for the invention where hot oxidant 16' and hot fuel 14' are separately injected in the furnace through oxidant injectors 7 and fuel injectors 8 located in furnace wall 18. Another burner useful in the invention is illustrated in published European patent application no. 0 754,914, published on Jan. 22, 1997.

FIG. 5 represents a schematic process flow diagram of burner 6 and dual preheaters 20a and 20b which may be used in the following manner. Cool oxidant 16 enters either preheater 20a or 20b alternatively, depending on the positions of the flow control devices 30a–h which preferably operate either fully opened or fully closed. For example, a stream of cool oxidant 16 may be allowed to enter bed 20a which is filled with a plurality of ceramic balls 24, if a flow control device 30e is closed and flow control device 30f is opened, as well as flow control devices 30a, 30b, and 30d being closed and flow control devices 30g, 30c and 30h being opened. In this case, a warm oxidant 16' will be allowed to enter burner 6. Alternatively, flow control device 30f may be closed, flow control device 30e opened, as well as flow control devices 30a, 30b, and 30d being opened and flow control devices 30c, 30g, and 30h being closed, thus allowing cool oxidant stream 16 to enter bed 20b, thus creating a warm oxidant stream 16' which is allowed to enter burner 6. Of course, the same arrangement may be envisioned with cool fuel stream 14, with the provision that the intermediate fluid is preferably an inert fluid like gaseous nitrogen. In this case the inert intermediate fluid would preferably be recycled in order to reduce the operating costs. Another inert intermediate fluid could be produced by consuming the oxygen in the intermediate fluid by combusting the O2 with methane or some other fuel. The result would be a host of combustion products which would be further heated in the primary heat transfer means, and used as the intermediate heat transfer fluid. Using the apparatus illustrated in FIG. 5, bed 20a may be operating to preheat an oxidant stream, while bed 20b is being regenerated using a hot intermediate fluid stream 12. Control devices may be valves or fluidic flow controllers.

Figure 6:
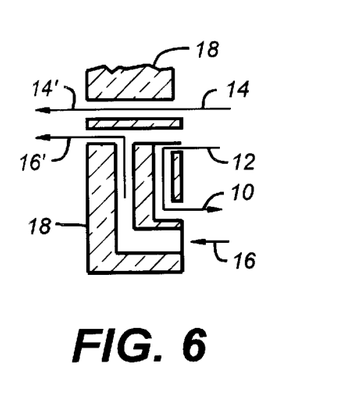
FIG. 6 is a schematic process flow diagram of an integrated first wall/burner/heat exchanger useful in the invention.

FIG. 6 illustrates an embodiment where the burner and burner preheater means actually form a portion of the furnace wall. Thus, furnace wall 18 is shown allowing a cool stream of fuel 14 to pass therethrough, first contacting co-currently with a hot intermediate fluid stream 12. Also, a cool oxidant stream 16 exchanges heat countercurrently with hot intermediate fluid stream 12 to form a warm oxidant stream 16'.

EXAMPLES

The following examples are merely intended to illustrate, and not limit, the invention.

Example 1

Figure 7:
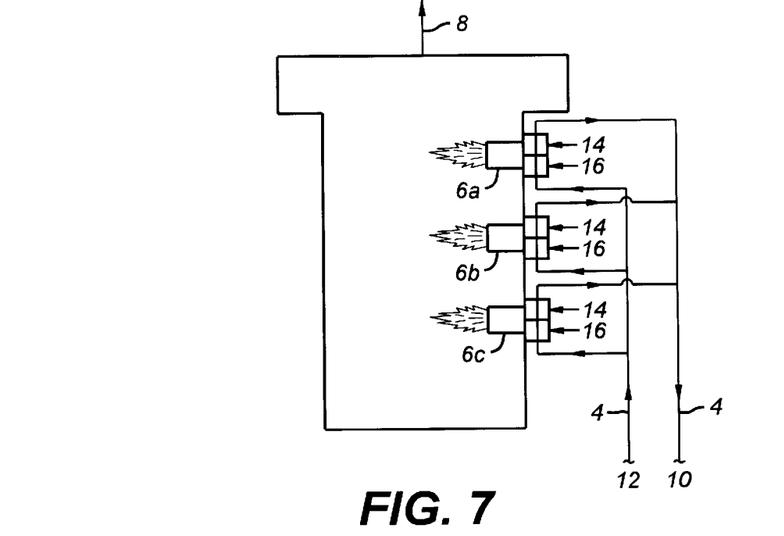
FIG. 7 is a plan view of a typical furnace used in the glass production industry.
Figure 8:
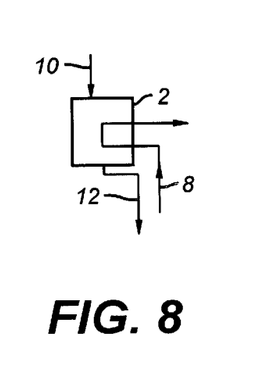
FIG. 8 is a schematic process flow diagram of heat exchanger means for exchanging heat between a cold intermediate fluid and hot flue gases used in the invention.
Figure 9:
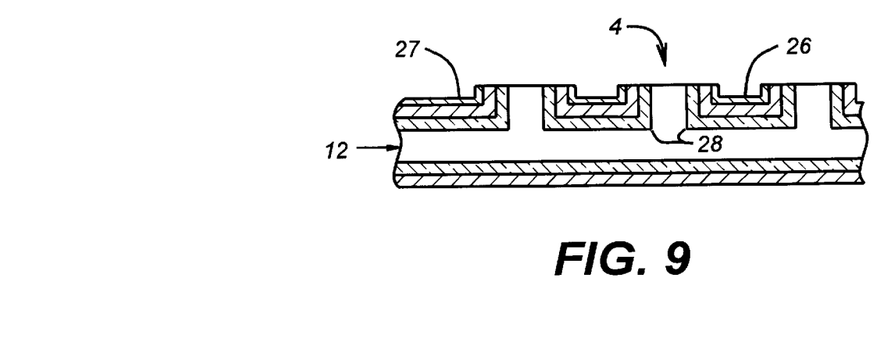
FIG. 9 is a schematic process flow diagram of a manifold useful in the invention for heating hot air, when used as an intermediate fluid, to a series of burners.

An apparatus of the invention is proposed to recover some of the waste heat from the flue gas of a furnace used in the glass industry. The furnace pull rate is assumed equal to 250 metric tons per day of soda-lime glass. Cullet (55% in weight) and batch mixture (45% in weight) are loaded at ambient temperature into the furnace. The heat of elaboration for this glass was 575 kWh per metric tons, accounting for the energy required to vaporize the water contained in the batch, the enthalpy of the chemical reactions in the batch, and the enthalpy of the molten glass at 1400° C. FIG. 7 is illustrative of the furnace, wherein hot intermediate fluid 12 is transported to each burner 6a, 6b, 6c, etc. (only three burners illustrated). Fuel 14 (here natural gas) and oxidant 16 are preheated in each burner 6 as explained in the following. Hot flue gas 8 was used to warm a stream of intermediate fluid (air) 10 in primary heat transfer means 2 (FIG. 8). The hot air stream 12 was split at the furnace to feed a set of burners on one side of the furnace and a set of burners on the other side of the furnace (again, for simplicity, only three burners are illustrated in FIG. 7). FIG. 9 illustrates in section a portion of transport means 4. In this embodiment, transport means 4 is a carbon steel pipe 26 lined with refractory material 28, and covered with insulating material 27 to reduce the heat losses while transporting the hot intermediate fluid 12.

The molar composition of the oxidant supplied to the burner is a product of a vacuum swing adsorption oxygen plant: 90% O2, 5% N2 and 5% Argon. The fuel is natural gas with a heat content of 10.55 kWh/Nm3. No electrical boosting is used in the furnace. The batch and cullet material release 69.6 Nm3 of a gas mixture composed of 59% CO2 and 41% water per metric ton of molten glass due to the humidity of the material and the chemical decomposition of the batch in the furnace. The total losses through walls, crown and ports equal 3300 kW.

The flue gas temperature is assumed equal to 1420° C. for all cases studied. It is also assumed that 5% of the molecular oxygen required to completely burn the fuel comes from air infiltration, and that the flue gas contains 2% of oxygen measured on a dry basis.

A baseline calculation was conducted assuming that both the oxidant and natural gas are supplied to the burners at room temperature (25° C.). The corresponding fuel energy required was 10,180 kW. The corresponding pure oxygen consumption was 83.7 metric tons per day.

The three following examples illustrate the fuel and oxidant savings that can be expected from an apparatus of the invention for the previous furnace configuration, depending on the heat exchangers, fluid preheaters and temperature levels.

Example 2

In the first case, the energy of the flue gas is partially recovered with some ceramic heat exchanger medium functioning as the primary heat transfer means that is used to preheat 3150 Nm3 of air as the intermediate cold fluid from 25° C. to 1100° C. The flue gas temperature at the outlet of the primary heat transfer means is equal to 850° C. The hot intermediate fluid is transported through highly insulated pipes to the burners, for which it is assumed that the heat losses can be neglected. The hot intermediate fluid flows through pairs of high temperature heat exchangers (preheaters) installed in series. There are as many pairs of heat exchangers as burners installed in the furnace. For each burner, first, the oxygen is preheated to 1000° C. then the natural gas to 250° C. The intermediate fluid leaves the second heat exchanger at 210° C. The fuel requirement to produce the 250 metric tons per day of glass drops to 9,080 kW, which corresponds to fuel savings of 10.8% and the equivalent reduction of oxygen consumption.

Example 3

In the second case, 3150 Nm3 of air as the intermediate fluid is only preheated to 700° C. by some metallic heat exchanger medium functioning as the primary heat transfer means that imposes a lower limit of the temperature due to present state-of-the-art. The flue gas leaves the heat exchanger medium at 1040° C. Heat losses in the means for transporting the hot intermediate fluid are also neglected for this example. Again, for each burner installed in the furnace, a pair of heat exchangers (preheaters) is installed in a series configuration to preheat the oxidant and the natural gas fuel. By cooling down the intermediate fluid to 300° C., the oxygen can be preheated to 600° C. and the natural gas to 260° C. The fuel requirement is down to 9,467 kW, which corresponds to fuel and oxygen savings of 7.0%.

Example 4

This example is similar to Example 3 but the heat exchangers (preheaters) at the burners are placed in parallel. The intermediate fluid, 4200 Nm3, is preheated to about 700° C., transported to the burners without any significant heat loss, then the flow is split at each burner. Both the oxidant and the natural gas are preheated to 600° C., while the intermediate fluid is cooled down 280° C. The fuel requirement is now 9,182 kW, which translates in a 9.8% fuel and oxidant consumption savings.

Methods of using the inventive apparatus of the invention are described in the following examples that discuss possible furnace configurations.

Example 5

Figure 10:
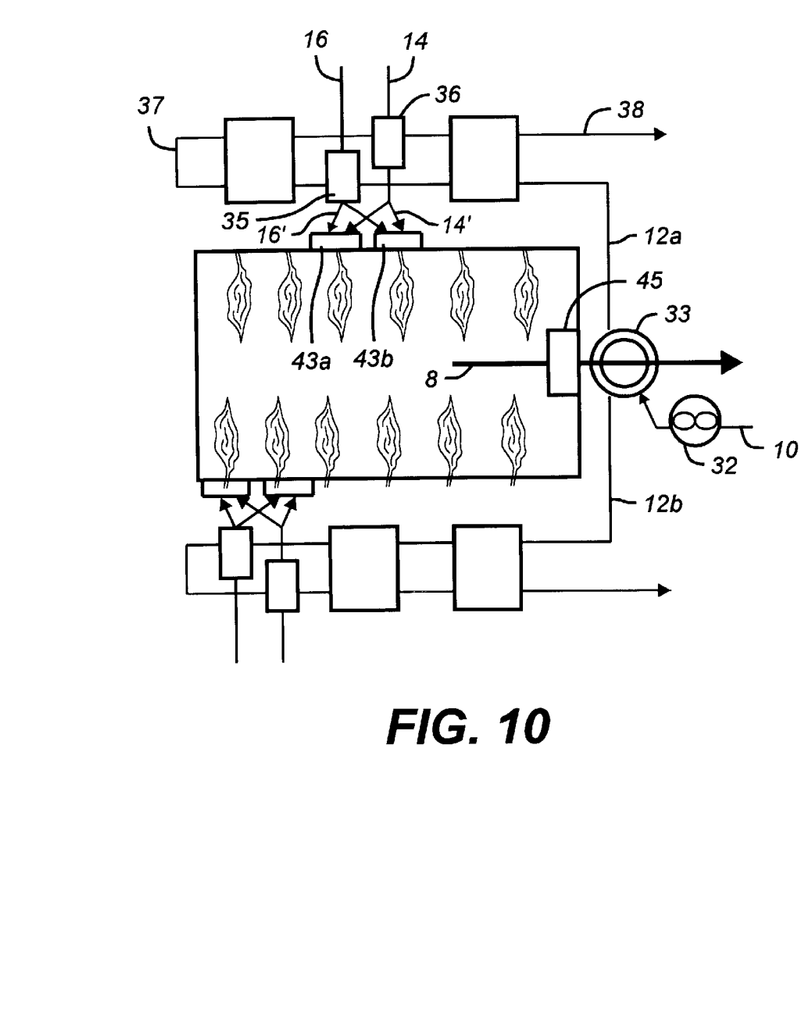
FIG. 10 is a schematic process flow diagram representing a method of using the apparatus of the invention for an example applied to a side fired type of glass furnace.

The first configuration can be used in a side fired furnace that uses for example twelve oxidant-fuel burners (FIG. 10). This firing configuration is the most common for oxidant-fuel fired furnaces in the glass industry. In this example, numerical values are given for illustration purposes only; different temperature levels can be used in the method of use of the apparatus of the invention. The flue gas 8 leaves the furnace through the stack 45 at about 1420° C. The cold intermediate fluid, air 10, is vented by the circulation fan 32 through a radiative metallic recuperator 33 and preheated to about 700° C. The colder flue gas 22 can be thereafter treated at a lower temperature of about 1000° C. The hot intermediate fluid flow rate is split to each side of furnace in streams 12a and 12b. In this particular embodiment, the burners on each side of the furnace are grouped by pairs in order to reduce the number of oxidant and fuel preheaters. Other groups of burners can be formed with the burners located on each side of the furnace. In the present arrangement, for 6 burners (43) on each side there are only three oxygen preheaters (35) and three natural gas preheaters (36). The hot intermediate fluid 12a flows through the three oxidant preheaters (metallic or ceramic) in series before the colder intermediate fluid 37 flows through the three natural gas preheaters also installed in series. The cold oxidant 16 and cold fuel 14 are heated respectively to about 600° C. and about 260° C. The hot oxidant and hot fuel 16' and 14' are split between the two burners 43a and 43b and are burned in the furnace which created in part the flue gas 8 at about 1420° C. The cold intermediate fluid 38 leaves the sixth heat exchanger and is vented to a stack at about 300° C.

Example 6

Figure 11:
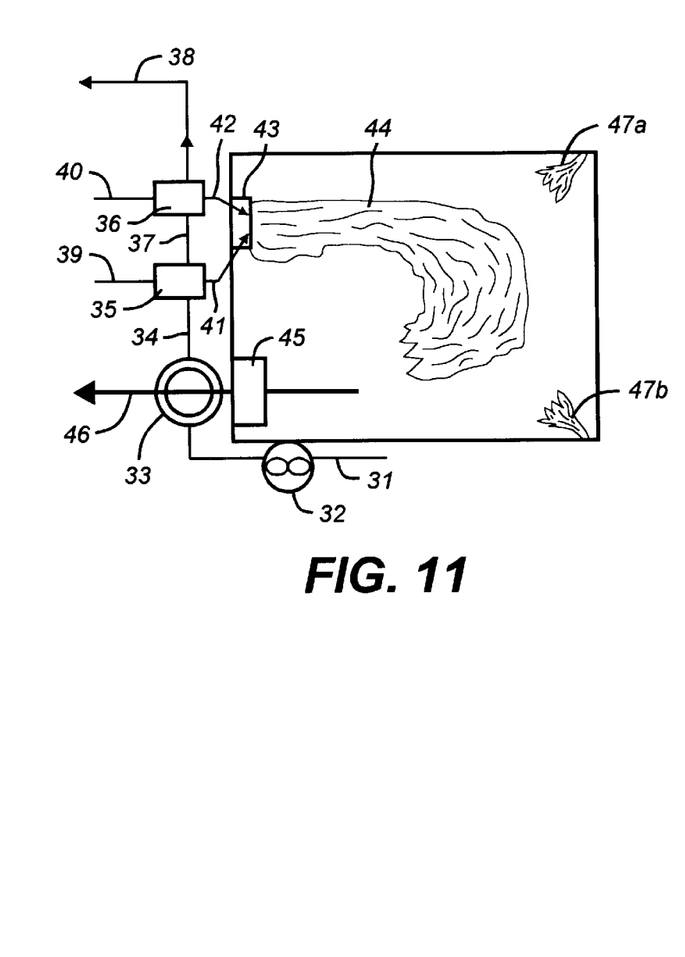
FIG. 11 is a schematic process flow diagram of an end-fired type of glass furnace, wherein a single preheated oxy-fuel burner is employed.

The second configuration (FIG. 11) can be used in a end-fired furnace with for example a unique large oxy-burner 43 that supplies the main part of the energy and some additional conventional oxy-fuel burners 47a and 47b for better coverage of the firing zone. Again, in this example, numerical values are given for illustration purposes only; different temperature levels can be used in the method of use of the apparatus of the invention. This configuration minimizes piping of the hot fluids: intermediate fluid, oxygen and fuel. The cold intermediate fluid, air 31, goes through the circulation fan 32 before being preheated in the radiation metallic (for example) recuperator 33 up to about 700° C. by the combustion gas 44 leaving the furnace by the stack 45 at about 1420° C. The cooled furnace exhaust 46 can be thereafter treated or vented. The hot intermediate fluid 34 then preheat the cold oxygen 39 and the cold natural gas 40 by flowing through the two heat exchangers in series 35 and 36 (respectively). The cold intermediate fluid 38 flows to a stack at about 300° C. The hot gases, oxygen 41 at about 600° C. and natural gas 42 at about 260° C., are burned in the burner 43 to create the flue gas leaving the furnace 44 (the burners 47a and 47b also contribute the flue gas) at about 1420° C.

Example 7

Figure 12:
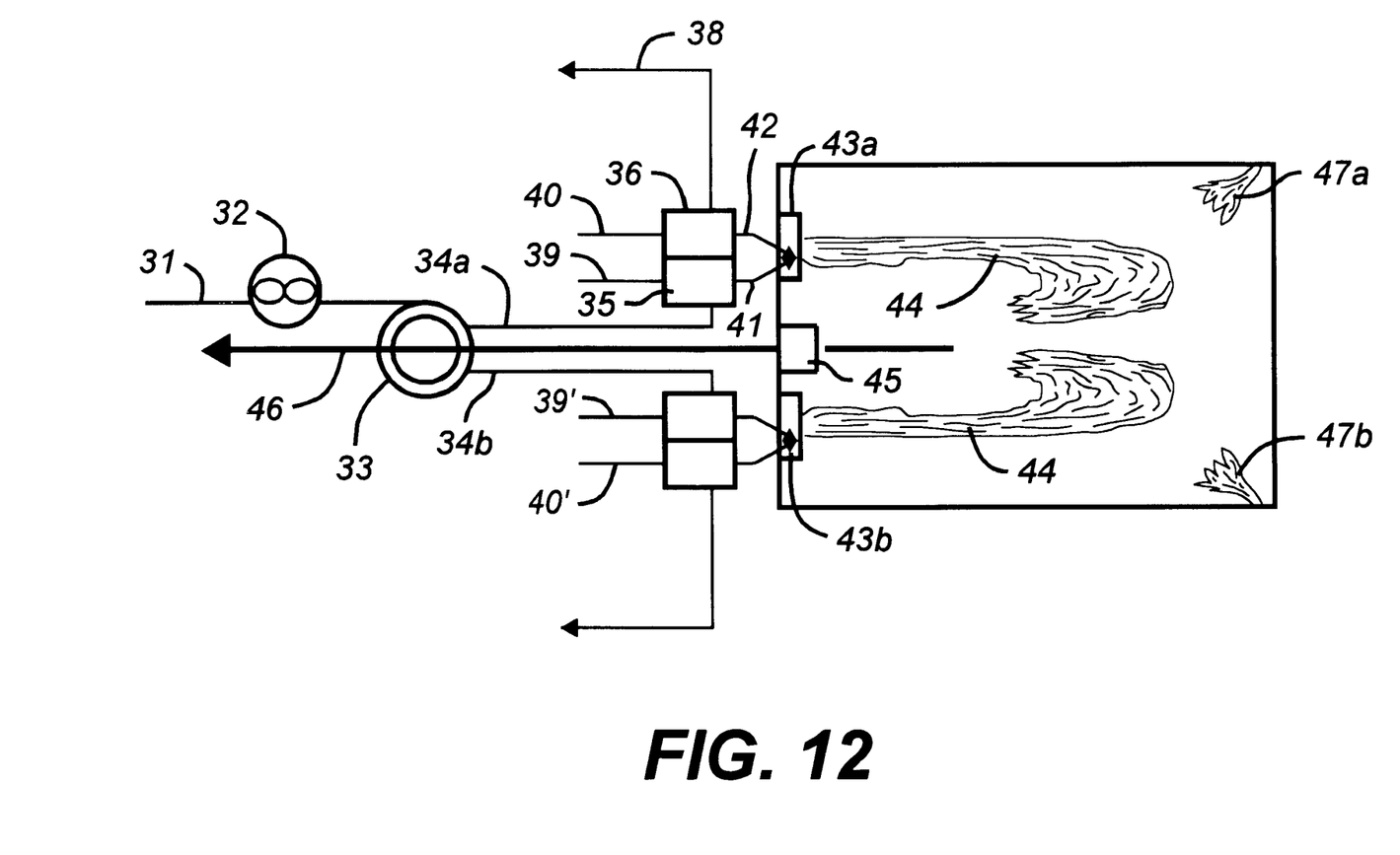
FIG. 12 is a schematic process flow diagram of an end-fired type of glass furnace, wherein two preheated oxy-fuel burners are employed.

The third configuration (FIG. 12) can be used in an end-fired furnace with only two large oxy-gas burners. This solutions limits the piping of the hot fluids: intermediate fluid, oxygen and natural gas. Again, in this example, numerical values are given for illustration purposes only; different temperature levels can be used in the method of use of the apparatus of the invention. The cold intermediate fluid, air 31, is vented through the circulation fan 32 before being preheated by the flue gas 44 leaving the furnace at about 1420° C. in the metallic radiation recuperator 33. The colder exhaust 46 goes then to the flue gas treatment or is vented through the stack at about 1000° C. The hot intermediate fluid is split for each side of the furnace into streams 34a and 34b at about 700° C. The hot stream 34a flows through the heat exchangers in series 35 and 36 to preheat first the cold oxygen 39 and then the cold natural gas 40. The cold intermediate fluid 38 is then vented through at about 300° C. The hot oxygen 41 at about 600° C. and the hot natural gas 42 at about 260° C. are burned in the burner 43a to create the flue gas 44. The other hot fluid burner 43b and the firing burners 47a and 47b contribute also to the flue gas 44 that leaves the furnace through the stack 45.

While reference has been made to specific embodiments, these are only to be illustrative and one of ordinary skill in the art may alter such embodiments without departing from the scope of the appended claims.

What is claimed is:

1. A method of cooling hot flue gas from combustion process, the method comprising:
   a) flowing the hot flue gas through a primary heat transfer means;
   b) flowing an initial intermediate fluid having an initial intermediate fluid temperature through said primary heat transfer means thereby exchanging heat and cooling the hot flue gas to form a cooled flue gas and a hot intermediate fluid;
   c) flowing the cooled flue gas to treatment means prior to exhausting the cooled flue gas;
   d) flowing the hot intermediate fluid to suitable heat exchange means to transfer heat to oxygen and/or fuel, and/or a load, and create a cool intermediate fluid; and
   e) venting the cooled intermediate fluid to atmosphere.

2. A method of recovering heat from hot flue gases, the method comprising the steps of:
   a) combusting a fuel with oxygen in one or more oxygen-fuel burners to create a main flow of hot flue gas and combining said main flow of hot flue gas with other combustion products and process gases to form a hot flue gas;
   b) flowing the hot flue gas and an initial intermediate fluid having an initial intermediate fluid temperature through primary means for transferring heat between the hot flue gas and the initial intermediate fluid to create a hot intermediate fluid; and
   c) transferring heat from the hot intermediate fluid to either the fuel, the oxygen, or both, by flowing the hot intermediate fluid through one or more preheater means in which either the fuel, the oxygen, or both are preheated with the hot intermediate fluid prior to the fuel and the oxygen entering one or more oxygen-fuel burners which create said main flow of hot flue gas, and creating a cooled intermediate fluid which is then vented to atmosphere.

3. Method in accordance with claim 2 wherein said initial intermediate fluid is a gas.

4. Method in accordance with claim 3 wherein said gas is selected from the group consisting of air, water vapor, carbon dioxide, nitrogen and gases generated by combusting a fuel and an oxidant.

5. Method in accordance with claim 4 wherein said gas is air.

6. Method in accordance with claim 2, wherein said initial intermediate fluid is a liquid.

7. A method of recovering heat in a furnace fired from the sides that uses multiple oxidant-fuel burners, the method comprising:
   a) creating a main flow of hot flue gas by combining combustion products from burning fuel and oxidant in a plurality of side-mounted burners, a first portion of the burners mounted on a first side of a furnace, and a second portion of the burners mounted on an opposite side of the furnace, and combining said main flow of hot flue gas with other combustion products and process gases to form a hot flue gas;
   b) flowing the hot flue gas through a flue chimney at a first temperature, the hot flue gas flowing through a primary means for transferring heat;
   c) flowing an initial intermediate fluid having an initial intermediate fluid temperature, through said primary means for transferring heat to preheat the initial intermediate fluid via indirect contact with the hot flue gas, thus creating a hot intermediate fluid;

d) splitting the hot intermediate fluid flow into two streams, a first stream flowing to the first side of the furnace and a second stream flowing to the opposite side of the furnace, wherein on each of said first and opposite sides of the furnace are positions for a plurality of oxidant preheaters and a plurality of fuel preheaters, and a plurality of burners;

e) flowing each of the first and second flows of hot intermediate fluid through one or more oxidant preheaters in series, thus creating first and second flows of cooled intermediate fluid and a plurality of heated oxidant streams;

f) flowing the cooled intermediate fluid through the fuel preheaters also installed in series, thereby creating a cold intermediate fluid and a plurality of heated fuel streams; and g) splitting the heated oxidant and heated fuel streams to amount of streams equal to the number of burners to combust the fuel in the furnace, thus creating the main flow of hot flue gas.

8. Method in accordance with claim 7 wherein said initial intermediate fluid is a gas.

9. Method in accordance with claim 8 wherein said gas is selected from the group consisting of air, water vapor, carbon dioxide, nitrogen and gases generated by combusting a fuel and an oxidant.

10. Method in accordance with claim 9 wherein said gas is air.

11. Method in accordance with claim 7 wherein said initial intermediate fluid is a liquid.

12. An apparatus suitable for recovery of heat from hot flue gases, the apparatus comprising:

(a) at least one primary means for transferring heat between a hot flue gas having a hot flue gas temperature, and an initial intermediate fluid, the initial intermediate fluid having an initial intermediate fluid temperature which is less than the hot flue gas temperature, to create a hot intermediate fluid and to cool the hot flue gas;

(b) one or more oxygen-fuel burners which create the main flow of the hot flue gas, the oxygen-fuel burners being associated with preheater means in which either a fuel or oxygen is preheated by the hot intermediate fluid, and thus creating a cooled intermediate fluid;

(c) transport means for transporting the hot intermediate fluid to at least one of the preheater means; and (d) means for venting the cooled intermediate fluid to atmosphere.

13. Apparatus in accordance with claim 1 wherein said primary heat transfer means comprises a conduit positioned in a flue gas duct such that the hot flue gas contacts the outside of the conduit and the initial intermediate fluid enters the conduit, and the hot intermediate fluid exits the conduit.

14. Apparatus in accordance with claim 1 wherein said primary heat transfer means comprises a conduit positioned in a flue gas duct such that the hot flue gas contacts the inside of the conduit and a minor portion of the initial intermediate fluid enters the conduit, and mixes with the hot flue gas to form a minor portion of the hot intermediate fluid.

15. Apparatus in accordance with claim 1 wherein said primary heat transfer means comprises a heat exchanger comprising a plurality of ceramic passages defining at least one channel for the initial intermediate fluid to enter and the hot intermediate fluid to exit and at least one channel for the hot flue gas to enter and cooled flue gas to exit.

16. Apparatus in accordance with claim 1 wherein said transport means comprises an internally lined carbon steel pipe, said pipe internally lined with ceramic material.

17. Apparatus in accordance with claim 1 wherein said preheater means comprises ceramic elements.

18. Apparatus in accordance with claim 17 wherein said ceramic elements are spherical in shape.

19. Apparatus in accordance with claim 1 wherein said preheater means comprises Nickel based elements.

20. Apparatus in accordance with claim 1 wherein said burners comprises ceramic elements.

21. Apparatus in accordance with claim 1 wherein said preheater means are integral with said burners.

* * * * *

UNITED STATES PATENT AND TRADEMARK OFFICE
CERTIFICATE OF CORRECTION

PATENT NO. : 6,071,116
DATED : June 6, 2000
INVENTOR(S) : Philippe, et al.

It is certified that error appears in the above-identified patent and that said Letters Patent is hereby corrected as shown below:

Column 16,
In the first line of Claim 13, please change the dependency from "claim 1" to --claim 12--.
In the first line of Claim 14, please change the dependency from "claim 1" to --claim 12--.
In the first line of Claim 15, please change the dependency from "claim 1" to claim 12--.
In the first line of Claim 16, please change the dependency from "claim 1" to claim 12--.
In the first line of Claim 17, please change the dependency from "claim 1" to --claim 12--.
In the first line of Claim 19, please change the dependency from "claim 1" to --claim 12--.
In the first line of Claim 20, please change the dependency from "claim 1" to --claim 12--.
In the first line of Claim 21, please change the dependency from "claim 1" to --claim 12--.

Signed and Sealed this

Third Day of July, 2001

*Attest:*

NICHOLAS P. GODICI
*Attesting Officer*  Acting Director of the United States Patent and Trademark Office